(12) United States Patent
Lange

(10) Patent No.: US 7,290,504 B2
(45) Date of Patent: Nov. 6, 2007

(54) SYSTEM AND METHOD FOR OPERATING AN INTERNAL COMBUSTION ENGINE WITH HYDROGEN BLENDED WITH CONVENTIONAL FOSSIL FUELS

(76) Inventor: David Lange, 5049 Pinetree Cr., Vancouver, BC (CA) V7W 3B4

(*) Notice: Subject to any disclaimer, the term of this patent is extended or adjusted under 35 U.S.C. 154(b) by 153 days.

(21) Appl. No.: 11/107,184

(22) Filed: Apr. 15, 2005

(65) Prior Publication Data
US 2005/0229872 A1 Oct. 20, 2005

Related U.S. Application Data

(60) Provisional application No. 60/563,616, filed on Apr. 20, 2004.

(51) Int. Cl.
*F02B 75/12* (2006.01)
(52) U.S. Cl. ............... 123/1 A; 123/304; 123/568.11; 123/DIG. 12; 123/585
(58) Field of Classification Search ............... 123/1 A, 123/575, DIG. 12, 568.11, 304, 3, 527, 585
See application file for complete search history.

(56) References Cited

U.S. PATENT DOCUMENTS

| | | | |
|---|---|---|---|
| 4,011,840 A | 3/1977 | Forster | |
| 4,175,523 A | 11/1979 | Noguchi et al. | |
| 5,408,957 A | 4/1995 | Crowley | |
| 5,546,902 A | 8/1996 | Paluch et al. | |
| 5,566,653 A | 10/1996 | Feuling | |
| 5,787,864 A | 8/1998 | Collier et al. | |
| 6,180,081 B1* | 1/2001 | Poschmann et al. | 423/648.1 |
| 6,311,648 B1 | 11/2001 | Larocque | |
| 6,506,360 B1 | 1/2003 | Andersen et al. | |
| 6,612,269 B2 | 9/2003 | Heffel et al. | |
| 6,638,493 B2 | 10/2003 | Andersen et al. | |
| 6,655,324 B2* | 12/2003 | Cohn et al. | 123/1 A |
| 6,845,608 B2* | 1/2005 | Klenk et al. | 60/274 |

FOREIGN PATENT DOCUMENTS

WO   WO 0214661 A1   2/2002

* cited by examiner

*Primary Examiner*—Stephen K. Cronin
*Assistant Examiner*—Katrina B. Harris
(74) *Attorney, Agent, or Firm*—John C. Gorecki; Jean-Pierre Fortin (57) ABSTRACT

A system for retrofitting an internal combustion engine to use a proportion of hydrogen gas and existing fossil fuel is disclosed. The system is comprised of a source of hydrogen gas and means for delivering hydrogen gas to the combustion chamber of the engine. The engine operating parameters are adjusted and the delivery of hydrogen is controlled to provide selective introduction of hydrogen gas throughout the engine's operating cycle. The source of hydrogen gas can comprise an onboard hydrogen reformer, or hydrogen and carbon monoxide can be reformed inside the cylinder from an on board carrier of hydrogen. A single point injector placed at the intake manifold in close proximity to the engine intake valve can be used to mix the hydrogen gas to the air/fossil fuel mixture or sequential injectors can deliver hydrogen in close proximity to each engine intake valve, or directly into each cylinder.

24 Claims, 6 Drawing Sheets

SYSTEM AND METHOD FOR OPERATING AN INTERNAL COMBUSTION ENGINE WITH HYDROGEN BLENDED WITH CONVENTIONAL FOSSIL FUELS

CROSS-REFERENCE TO RELATED APPLICATION

This application claims priority from U.S. provisional application Ser. No. 60/563,616 filed on Apr. 20, 2004, and which is incorporated herein by reference.

FIELD OF THE INVENTION

This invention relates generally to the use of hydrogen in an internal combustion engine, and particularly relates to promoting the use of hydrogen in existing internal combustion engines while minimizing engine retrofitting and invasion.

BACKGROUND OF THE INVENTION

Great efforts have been spent by the automotive industry to reduce our dependence on fossil fuels. Also, because of regulatory requirements, research continues to reduce emissions of internal combustion (IC) engines, regardless of whether they are powered by conventional gasoline, diesel or natural gas fuels.

In a typical gasoline automobile, the catalytic converter helps to reduce the harmful emissions, but such reductions can still be improved substantially. One of the biggest shortcomings of the catalytic converter is that it only works at a fairly high temperature. When an engine is cold, the catalytic converter does almost nothing to reduce the emissions at the exhaust.

Various attempts have been made to burn hydrogen and fossil fuel mixtures in IC engines in order to reduce harmful emissions but none have been commercially successful. Although these engines may operate to provide the intended results of lowering harmful emissions, the cost of retrofitting existing IC engines using these systems has made their deployment prohibitively expensive. In addition, if such engines were to be adopted, they would require a constant low cost source of low emission fuel, which will not happen unless a market for such fuel is present.

Attempts have been made at combining hydrogen with natural gas in an IC engine wherein gaseous hydrogen and natural gas were held in particular proportion in the same fuel tank. If the fuels are in the same tank, then an existing IC engine cannot perform well under load because the hydrogen displaces the critical amount of natural gas needed for optimal power. Since hydrogen stored in the same tank with natural gas cannot be selectively substituted, a dual fuel mixture such as this would inhibit engine power and performance when required by the vehicle.

No known systems have been successful beyond experimentation, possibly because they did not properly address the ability of existing engines to accept dual or new fuels, the stoichiometry of blended fuels, lack of electronic control capability and most importantly, little or no attention as to whether or not the resultant application could be commercially viable (i.e., whether it could attract auto, oil, government and consumer participation).

Makers of IC engines have rejected these technologies as not being either cost effective or effective at all in reducing emissions.

The reason that no one has invented a commercial hydrogen blended dual fuel retrofit system to reduce emissions in today's existing IC engines is because the economics of hydrogen fuel production and delivery have not been incorporated to attract industry and finance to thereby create a market for hydrogen fuel.

Other attempts have been made at applying hydrogen fuel cells to motive power. Unfortunately, a fuel cell requires hydrogen at up to 99.9999% purity, which is exorbitantly costly; moreover, fuel cells cannot operate on a blend of hydrogen and conventional fossil fuel—which is the essence of making a market transition from today's fossil fuel based economy to tomorrow's hydrogen economy. This notwithstanding, fuel cells will inevitably be a major part of the hydrogen future.

SUMMARY OF THE INVENTION

Accordingly, one object of the present invention is to inexpensively replace a large proportion of fossil fuels with hydrogen to reduce emissions in existing IC engines without affecting performance and longevity, or consumer convenience.

Another object of the present invention is to enable the use of an appropriate, low cost, retrofitting technology for IC engines in existing vehicles to create and promote the marketplace transition from present day fossil fuel consumption and its associated pollution, to a future clean hydrogen economy without the costs normally associated with the introduction of new automotive technologies, in particular, without the consumer having to purchase a new vehicle in order to reduce engine emissions.

In today's heavy dependence on existing IC engines operating on fossil fuels such as gasoline and diesel, such a transition can only be achieved if a) the cost of retrofitting an existing IC engine is minimal and b) a dependable and inexpensive zero emission source of hydrogen is available to the average consumer.

The present invention achieves this by introducing a system and method for enabling the use of hydrogen in an existing internal combustion engine with a minimum level of retrofitting. By using existing internal combustion engines, the invention permits the profitable move from today's fossil-fuel-based economy towards a future hydrogen economy by encouraging the production of hydrogen as an affordable transport fuel which can amortize the invention and its hydrogen production, distribution and fueling infrastructure while at once building consumer demand for new hydrogen vehicles as well as ever-cleaner sources of hydrogen fuel production.

The invention is accomplished by selectively substituting a percentage of conventional fossil fuels with hydrogen in certain segments of the engine's operating cycle. Introduction of hydrogen is done by minimally-invasive management of engine electronics, fuel delivery, engine timi after treatment of net emissions. The invention takes advantage of any internal combustion engine's inherent proclivity to burn hydrogen when excess air (i.e., oxygen) and cylinder capacity are available (i.e., when the engine is not needed for optimal power and/or safety). In particular, this happens when the full capacity for which the engine was designed is not being utilized (i.e., when an engine is underutilized) and is running most inefficiently and therefore emitting the most pollution on a relative basis; this is also where hydrogen has the most potential to reduce emissions because, in these modes of operation, power is not the primary purpose for the engine's operation and the engine (already having excess air) can accept a high proportion of hydrogen substitution.

According to one embodiment of the present invention, there is provided a system for retrofitting an internal combustion engine to use a proportion of hydrogen gas and existing fossil fuel. The system includes means for providing a source of hydrogen gas to the engine and means for delivering hydrogen gas from the hydrogen source directly to the combustion chamber, ie. one or more cylinders of the engine via separate hydrogen injectors. The system further includes means for adjusting the engine operating parameters and for controlling the delivery of hydrogen gas to said one or more cylinders to provide selective introduction of hydrogen gas throughout the engine's operating cycle.

In a further embodiment of the invention, the means for providing a hydrogen source includes an onboard hydrogen reformer and the means for delivering hydrogen gas to the engine cylinders includes a single or multi-point injector placed at the intake manifold in close proximity to the engine intake valve.

In yet another embodiment of the invention, there is provided a method of operating an internal combustion engine using a proportion of hydrogen gas with existing fossil fuel. A source of hydrogen gas is provided to the IC engine by delivering hydrogen gas to one or more cylinders of said engine. Operating parameters of the engine are adjusted according to fuel volumes and engine efficiencies across the engine's operating spectrum. The delivery of hydrogen gas is controlled according to the operating parameters to provide selective introduction of hydrogen gas throughout the engine's operating cycle. Hydrogen gas can be dispersed in one or more cylinders prior to ignition, or as a means of ignition.

In a further embodiment, the engine operating parameters are adjusted by recording the engine's original equipment manufacturer's (OEM) operating parameters and mapping these parameters upon introduction of hydrogen in the cylinders. A proportional substitution of fossil fuel with hydrogen gas is then made in certain segments of the engine operating cycle. Detonation timing and delivery of hydrogen gas and fossil fuel is then managed to maintain original engine performance according to the recorded parameters.

Other advantages and novel features of the present invention will become apparent from the detailed description of the invention.

BRIEF DESCRIPTION OF THE DRAWINGS

In order to impart full understanding of the manner in which this object and others are attained in accordance with the present invention, preferred embodiments thereof will be described hereinafter with reference to the accompanying drawings, wherein.

DETAILED DESCRIPTION OF THE PREFERRED EMBODIMENT

In order to lighten the following description, the following acronyms will be used:
IC Internal Combustion;
EGR Exhaust Gas Recovery;
NGV Natural Gas Vehicle;
OEM Original Equipment Manufacture As indicated above, the substitution of fossil fuels for hydrogen cannot be accomplished economically unless there are incentives from government agencies (which have control over the tax structure of the fuels), to all of the energy industry, the automotive industry and the end user, i.e. the consumer. Given the current lack of such incentives, the main objective of how to promote the use of hydrogen and how to set up the infrastructure to supply a source of hydrogen remains. With the use of the system and method of the present invention, existing vehicles can be modified to make use of hydrogen in an economical way. Further, the addition of hydrogen to existing fuel is a permanent environmental solution because hydrogen will not break down like a catalyst and therefore will always give constant results.

Figure 1:
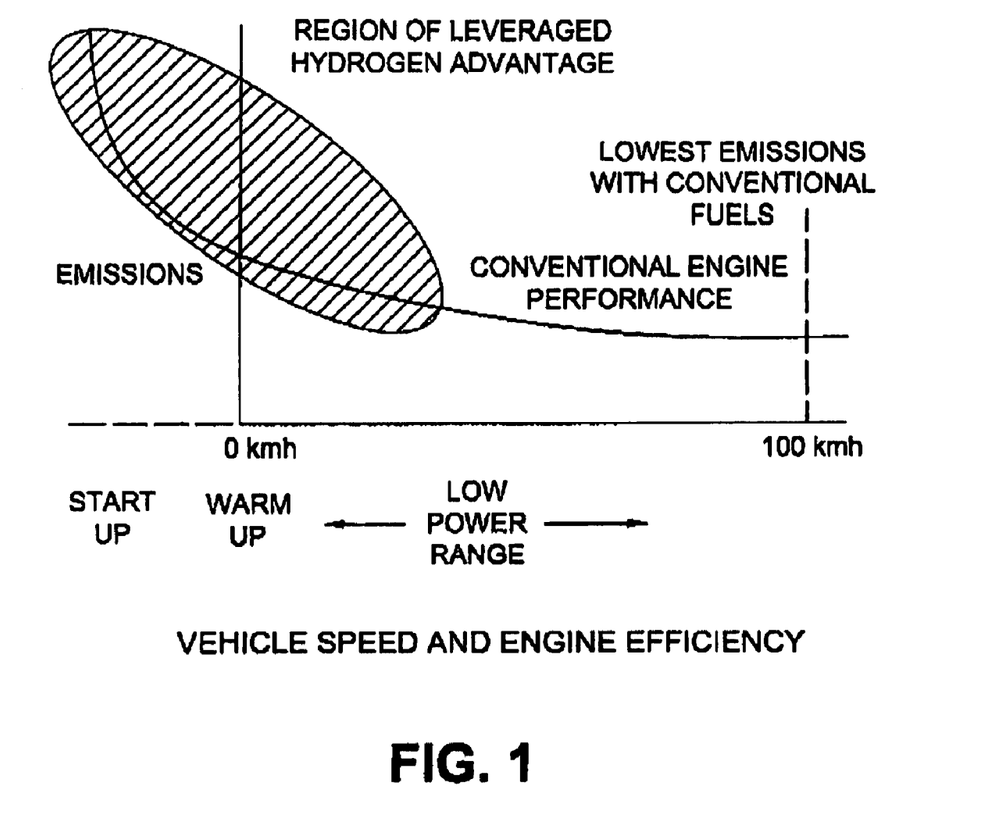
FIG. 1 is a chart illustrating the level of emissions of an IC engine according to its power range.

Referring now to FIG. 1, we have shown a graph illustrating the level of emissions of an IC engine according to its power range. The graph of FIG. 1 indicates the area of engine operation for optimal hydrogen performance and leveraged benefits. It can be seen that an IC engine operating on standard fossil fuels will emit, on a relative proportion, the most amount of polluting emissions during startup, warm-up and low power ranges. It can therefore be derived that the optimal emissions reduction on a relative basis can be obtained by the substitution of hydrogen at these ranges, i.e. at startup, warm-up and low power ranges. In addition, notwithstanding that proportionally less hydrogen can be substituted at higher loads and speeds, a larger volume of relatively lower emissions will be realized while quantitatively more hydrogen is consumed to amortize both the retrofit and fueling infrastructure. Given the economic limitations identified above, a move away from a polluting fossil fuel economy to a clean hydrogen economy and the marketing of hydrogen as a transportation fuel, can only achieved by a staged transition, whereby existing conventional IC engines are initially retrofitted to bum a certain percentage of hydrogen by energy. Using this approach, a number of advantages are accomplished, a) an immediate direct reduction in fossil fuel consumption, b) correspondingly lower emissions, and c) improved engine performance. A successful transition can be made if we can, in certain segments of the engine's operating cycle, retain the power of conventional fossil fuels, such as gasoline and diesel, but with resulting emission levels of a hydrogen-only vehicle. One disadvantage of hydrogen is its lower power/volume ratio as compared with gasoline or diesel fuel. That is, adding hydrogen doesn't drop engine efficiency, but it does reduce power. On the other hand, where hydrogen is needed most for emissions reduction (i.e., startup, warm-up and slow speed), is where engine capacity and hydrogen stoichiometry together have the most latitude to improve combustion without sacrificing power. Thus, a proper hydrogen dual fuel application should have the power provided by conventional fossil fuels but the emission benefits of a hydrogen-only vehicle.

Figure 2:
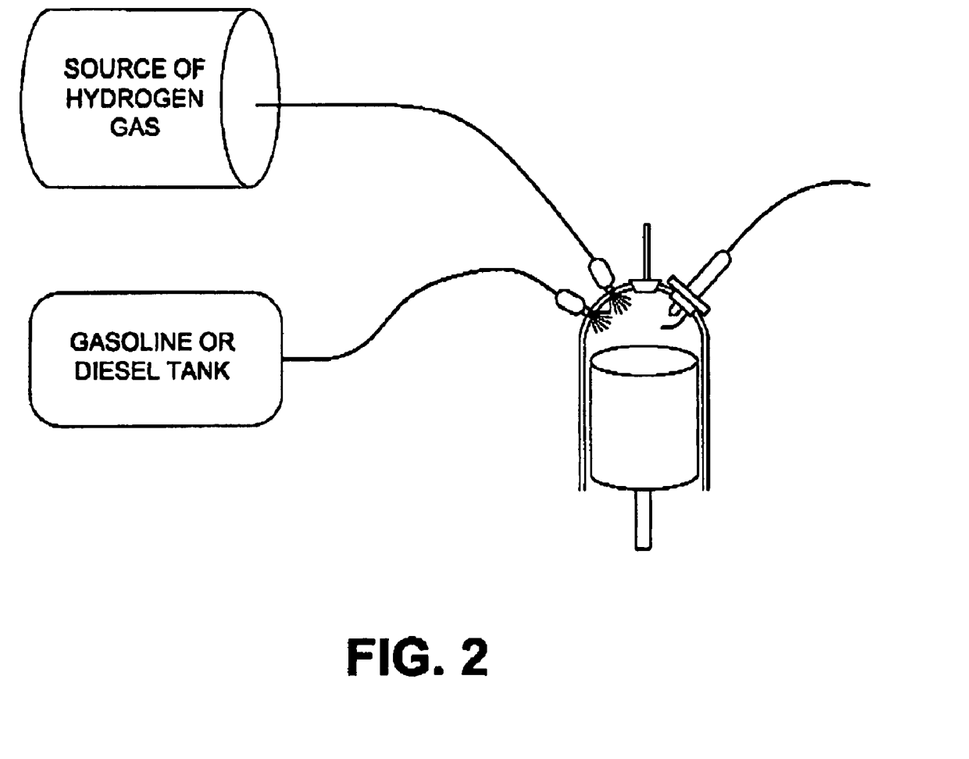
FIG. 2 is a prior art schematic of a hybrid hydrogen/hydrocarbon retrofit.

Referring now to FIG. 2, we have shown a system for introducing a variable gas mixture in an IC engine according the prior art. In this system, a mixture of hydrogen gas and hydrocarbon fuel is introduced directly in the combustion chamber of an IC engine. Whether delivered separately or combined with hydrocarbon fuel, hydrogen is injected directly in the combustion chamber via an expensive retrofit of the engine (i.e., providing direct access to the combustion chambers or cylinders) and without taking into consideration variations of the engine operating parameters some of which may be affected by the use of hydrogen to displace the hydrocarbon fuel.

Figure 3:
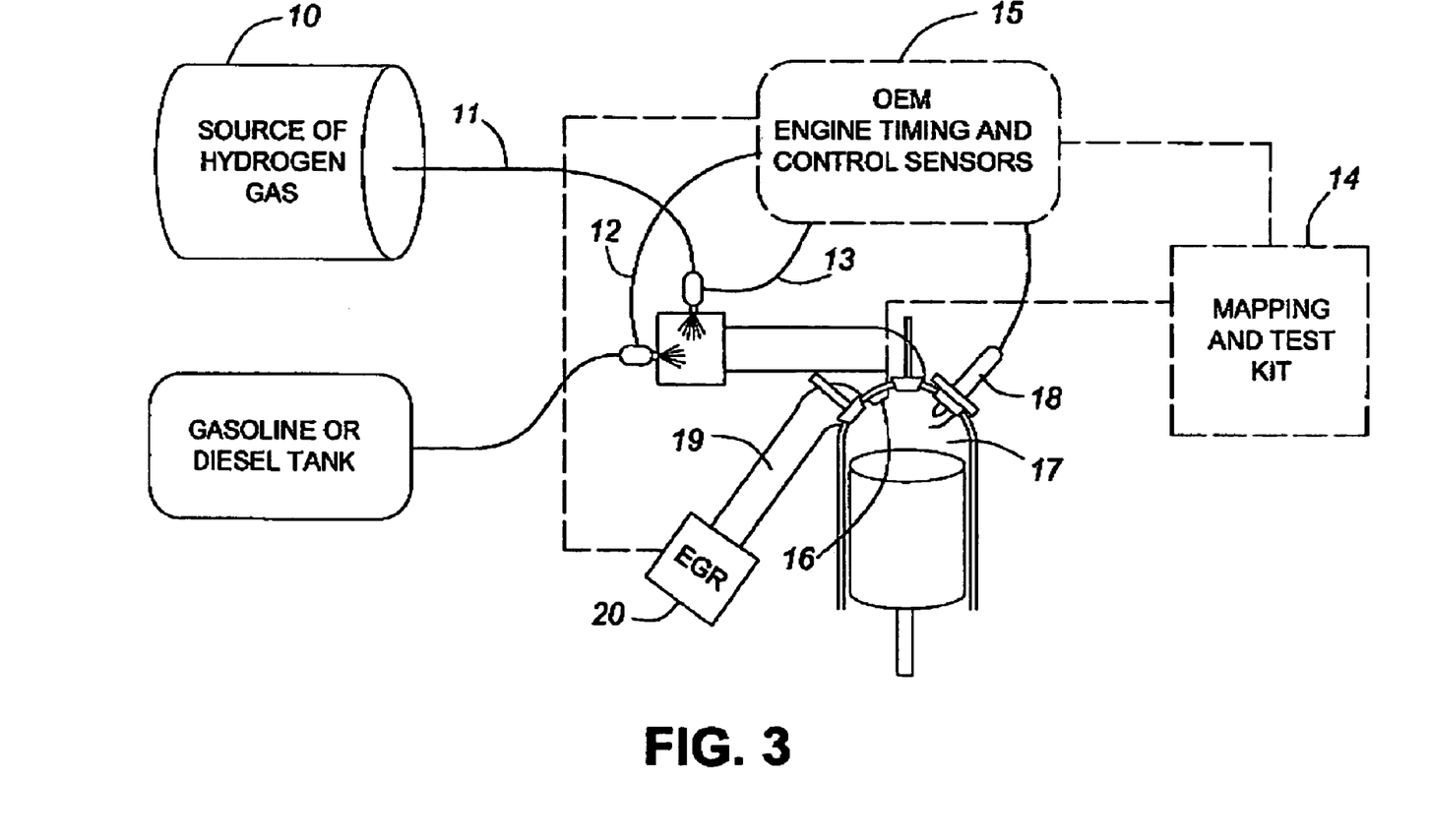
FIG. 3 is a schematic illustrating the retrofit components of the system of the present invention.

With reference to FIG. 3, we have shown a diagram illustrating the retrofit system of the present invention. As indicated previously, an existing IC engine can easily be retrofitted such that a certain proportion of hydrogen gas is introduced to replace regular fossil fuel or hydrocarbons at predetermined segments of the engine's operating cycle. In order to provide hydrogen gas to the engine, a source of hydrogen 10 is installed on-board the vehicle being retrofitted. The source of hydrogen 10 can be from a tank suitable to store hydrogen in liquid or gaseous form. Although it is envisaged that hydrogen could be stored in liquid form in a moderately pressurized cylinder, this is not at present practical or economical. A future alternative is the use of metal hydride storage manifolds to store hydrogen in a way similar to a sponge storing water. This increases the amount of onboard hydrogen gas storage. Such a solution is being developed by Ovonic of Rochester Hills, Mich.

Another source of hydrogen can be derived from the use of an onboard fuel processor or hydrogen reformer. Used either on its own or with onboard storage, the fuel processor can be used to generate a suitable amount of hydrogen gas.

As indicated above, the main issue with permitting the use of hydrogen in either existing or future IC engines and/or fuel cells is energy storage. In order to avoid having large, heavy high pressure tanks, a liquid hydrogen rich fuel is preferable to a hydrogen gas. The system of the present invention can make use of fuel processors for liquid fuels like ethanol and methanol, which are hydrogen carriers that are easily handled at ambient temperatures. Methanol is the most promising fuel in the short term; it can be stored and distributed in much the same way as gasoline is now. Both ethanol and methanol (as well as natural gas) can be converted to hydrogen in a reformer.

In the case of a methanol reformer, the goal of the reformer is, with optimal efficiency, to disassociate as much of the hydrogen (H) and carbon monoxide (CO) as possible from the methanol (CH3OH) molecule, while minimizing the total cycle added production of carbon dioxide (CO2), i.e., without a net increase in green house gases. Heat produced from methanol in the reforming process is used for the vaporization of liquid methanol and water. This mixture of methanol and water vapor is passed through a heated chamber that contains a catalyst.

As the methanol molecules hit the catalyst, they split into carbon monoxide (CO) and hydrogen gas (H2):

CH3OH=>CO+2H2

The water vapor splits into hydrogen gas and oxygen; this oxygen combines with the CO to form CO2. In this way, very little CO is released, as most of it is converted to CO2.

H2O+CO=>CO2+H2

Ethanol can be Reformed into H2, CO and CO2 Using a Similar Reaction.

Natural gas, which is composed mostly of methane (CH4), is processed using a similar reaction. The methane in the natural gas reacts with water vapor to form carbon monoxide and hydrogen gases.

CH4+H2O=>CO+3H2

Just as it does when reforming methanol, the water vapor splits into hydrogen gas and oxygen, the oxygen combining with the CO to form CO2.

H2O+CO=>CO2+H2

Some methanol or natural gas and carbon monoxide can make it through without reacting. These are burned in the presence of a catalyst, with a little air to supply oxygen. This converts most of the remaining CO to CO2, and the remaining methanol to CO2 and water. As will be described further below, various other devices may be used to clean up any other pollutants, such as sulfur, that may be in the exhaust stream.

Arvin Meritor's Plasmatron is a prototype reformer capable of providing such a source of hydrogen.

Note that some countries do not regard carbon dioxide as a pollutant. In these political jurisdictions, the foregoing reformer technologies can be applicable as CO (a poison) is further reduced to CO2 (considered harmless) in the presence of steam.

However, in those countries such as Canada where man made CO2 (as opposed to CO2 generated by natural biological processes) is regarded as a pollutant, then it is desirable to reform only ethanol, methanol or natural gas which have originally been produced with no unnatural emissions i.e., zero emissions; for example, from biomass. These zero emissions fuels are otherwise called "green" alcohols or "green" natural gas.

Using these green fuels, reformer technology can be more efficient if water is not used. The higher efficiency also releases more CO and less CO2. Moreover, the CO2 released, no matter how much or how little, is never greater than would have been the case if the biomass had simply been allowed to atmospherically deteriorate instead of being processed into a "green" alcohol or captured as "green" natural gas.

The introduction of "green" alcohols or natural gas can be important because existing gasoline engines have exhaust after treatment systems which, as previously shown, can reduce CO to CO2. But by and large, except in specific jurisdictions, existing diesel engines do not have such after treatment systems.

Moreover, CO is produced as part of the normal stoichiometry within an IC engine burning fossil fuel. Unlike the case for fuel cells where even the slightest CO will contaminate, CO is welcome in an IC engine as a source of engine power, and in the case of a gasoline engine, any CO that remains unburned is after treated in the exhaust system by a catalytic converter.

An IC engine, because of its high in-cylinder temperature, is itself a reformer.

Therefore, in a gasoline engine where after treatment already exists for residual CO, an external reformer is not needed as a source of H2 and CO. In this case, green alcohol or natural gas can be delivered directly into the cylinder to be disassociated into H2 and CO, both of which will burn to produce power with lower emissions than gasoline, and any residual CO will be converted to CO2 in after treatment. If the source of H2, CO and CO2 were to be green, there would be no net total cycle, well-to-wheel emissions.

However, in retrofitting an existing diesel engine system having no exhaust after treatment, a separate external source of hydrogen will be necessary to fuel a selective catalytic reactor (SCR) for conversion of NOX in the exhaust into benign N2 and O2. The requirement of this on board source of hydrogen for exhaust after treatment means that, on a diesel powered vehicle (and notwithstanding that the cylinder can itself be a reformer), a source of hydrogen fuel or an external reformer for hydrogen is necessary for NOX after treatment. It will therefore most likely make the best economic sense if a single reformer can deliver hydrogen fuel both in front of the engine to the cylinder, and again behind the engine for NOX after treatment; i.e., unlike in gasoline engines having catalytic after treatment, a diesel engine will require a distinct external source of hydrogen fuel to service exhaust after treatment.

The economics of green alcohols or natural gas production, and the cost and scale of on board reformer technology will determine what volume of the hydrogen required for substitution in an existing diesel engine will be delivered to the cylinder directly in the form of "green" alcohol or natural gas vis a vis the remaining volume of hydrogen to be separately reformed specifically for exhaust after treatment.

As shown in FIG. 3, hydrogen gas from source 10 is fed into the engine manifold 12 via a supply line 11 and injector 13. The hydrogen gas is mixed with the hydrocarbon fuel/air mixture at a predetermined level and timing according to the operating characteristics of the IC engine. The predetermined mixture and timing is derived according to a pre-set schedule or "mapping" for the type and model of engine and vehicle being retrofitted.

The "Mapping" of the engine is achieved using calibration equipment 14 and existing OEM engine sensors 15 to record vehicle and engine performance using its normal prescribed fuel, i.e. gasoline or diesel or natural gas. The recorded performance is then matched or exceeded by proportionally and selectively substituting gasoline or diesel with hydrogen for the benefit of getting reduced emissions. This mapping procedure requires for example, a combustion pressure piezometric sensor 16 to be inserted into a test cylinder for data collection and monitoring of hydrogen substitution.

Adjustments are made to determine the quantities of respective fuels, the timing of the introduction of conventional fuel into the cylinder, the introduction of hydrogen into the cylinder 17, and adjusting the timing of the spark 18 in a gasoline engine, or adjusting the timing of fuel injection in a diesel engine (not shown). Timing is optimized to preclude engine knock, uneven operation or backfire. Timing is also used to reduce emissions by varying the peak combustion temperature in the cylinder. The calibration equipment 14 used for mapping of the engine is shown in FIG. 3 in a dashed box to indicate that it is used only for the purpose of mapping the engine performance. Once this is completed for this particular engine, the calibration equipment 14 and sensor 16 are no longer required in order to operate the dual fuel engine.

As vehicle performance is maintained with the substitution of hydrogen, reduction of emissions resulting from the fuel mix is optimized by addressing engine electronics and fuel management, existing or additional catalytic after treatment on the exhaust system 19, and/or exhaust gas recirculation (EGR) system 20 which may need to be added to most diesel vehicles and possibly some gasoline and natural gas vehicles. An Exhaust Gas Recirculation (EGR) system is designed to reduce the amount of oxides of nitrogen (NOx) created by the engine during operating periods that normally result in high combustion temperatures. NOx is formed in high concentrations whenever combustion temperatures exceed 2500 degrees Farenheight. The EGR system reduces NOx by recirculating small amounts of exhaust gases into the intake manifold where it mixes with incoming mixture of air/fuel charge. By diluting the incoming mixture, peak combustion temperatures and pressures are reduced, resulting in an overall reduction in NOx output.

Although the above described calibration procedure is an expensive and invasive procedure, it should be noted that this process is completed only once for a specific type and model of engine in order to derive the appropriate mapping data characteristics of that engine. Once recorded and tested, the mapping data can later easily be downloaded to the OEM on board diagnostic system and OEM sensors 15 on engines of similar type and model or to a duplicate diagnostic system. The "map" developed above is downloaded to be used as a reference for engine performance and emissions reduction to be achieved as the retrofit system is applied commercially to that particular engine. The original engine software (or that in a duplicate diagnostic system) is adjusted for substitution with hydrogen of all or part of the original fossil fuel depending upon where the engine is required to be in the driver's operating cycle.

Figure 4:
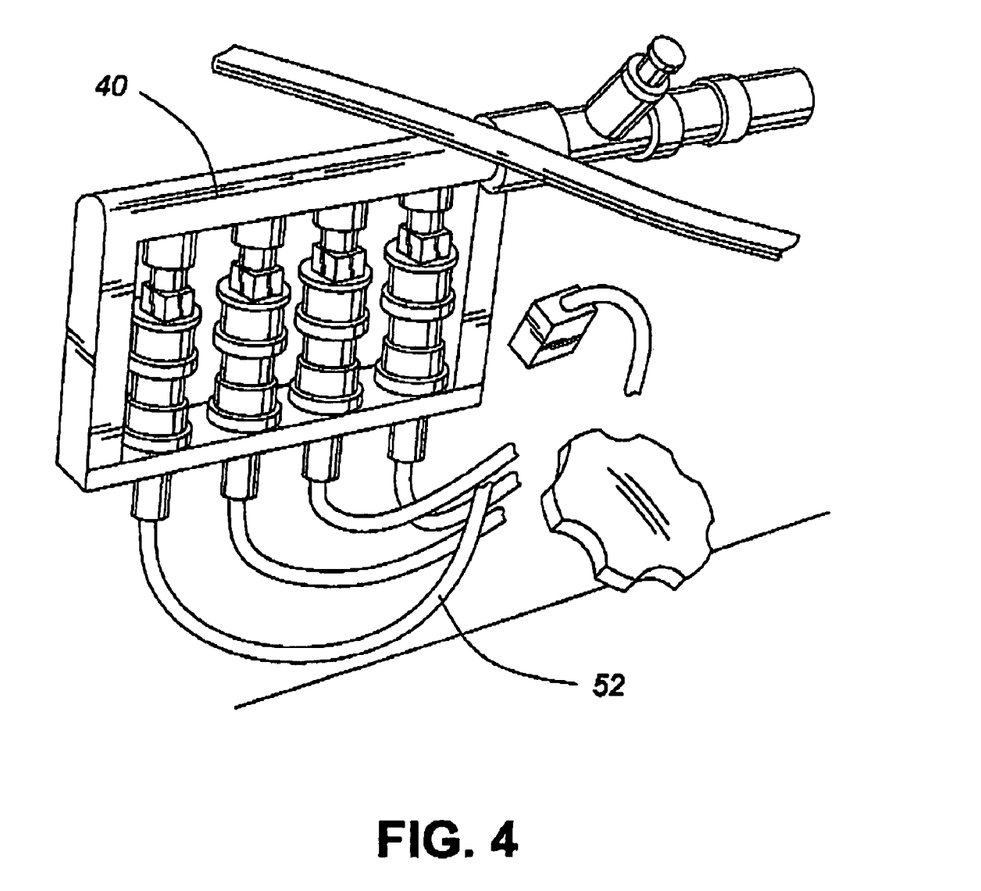
FIG. 4 is an illustration of a hydrogen gas injector block for use with the present invention.
Figure 5:
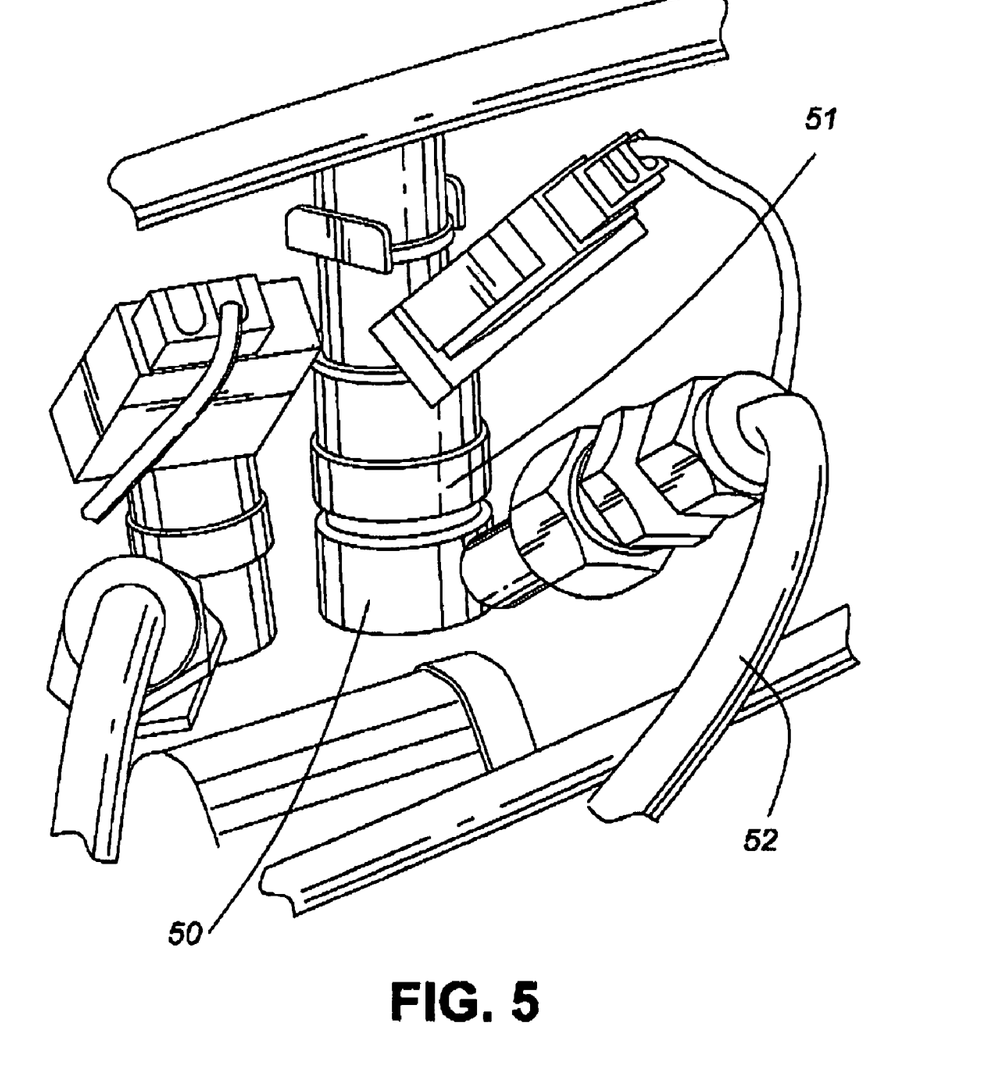
FIG. 5 is an illustration of a fuel injector adapter for use with the present invention.

Referring now to FIG. 4, we have shown a hydrogen injector block 40 which can easily be retrofitted in a vehicle using a gasoline IC engine. This hydrogen injection system is capable of injecting varying quantities of hydrogen near the intake valve. In FIG. 5, we have shown an injector adapter 50, which is used to enable introduction of hydrogen from the hydrogen injector block 40 of FIG. 4 into the combustion chamber of the engine. The advantage of the injector adapter 50 is that no expensive retrofit or access to the engine cylinders is required. Hydrogen is then supplied to one or more injectors 40 connected to a fuel injector adapter 50 located below the gasoline injectors 51 near the intake valve. The fuel injector adapters 50 house the gasoline injectors 51 while providing a port to pass hydrogen into the intake via a hydrogen supply hose 52. These injectors can be installed by raising the gasoline injectors and fuel rail slightly. The hydrogen injectors 40 are controlled to provide a delay in the hydrogen injection with respect to the start of gasoline injection.

The primary change in combustion properties with hydrogen substitution is the pressure variation in the compression and power stroke caused by the increased rate of heat release. The heat release rates indicate quicker combustion. The higher heat-release rates indicate earlier completion of combustion. The benefit of more rapid combustion is typically reduced heat transfer to the cylinder walls; hence, improved efficiency is possible.

However, the improved efficiency is due to higher peak combustion temperatures, which, in turn, cause excess nitrogen and oxygen present in the intake air, to combine into NOx. A classic solution to this problem is to retard the point of ignition; when ignition is retarded, combustion does not start until later, has a longer duration, and burns slower thus reducing the efficiency of combustion. But while this technique precludes formation of NOx and combustion knock, it also creates more soot (i.e., necessitating more frequent oil changes) and reduces fuel economy and engine performance.

An alternative and more effective method of reducing NOx is to lower the cylinder temperature and limit the amount of oxygen in the cylinder when peak combustion temperatures are raised for certain extended periods of engine operation (i.e., reduced oxygen results in lower cylinder temperatures and, therefore, reduced Nox production without tampering with the optimal setting of advanced ignition timing).

On the other hand, optimal combustion of hydrogen requires excess oxygen to produce the highest and most desirable cylinder temperature and pressure and, therefore, the most efficiency, best engine performance and highest fuel economy.

Hence, an enigma is created by substituting hydrogen for fossil fuels in order to reduce emissions and increase engine efficiency, engine performance, durability, reliability and fuel economy, because the necessary peak combustion temperature, when prolonged above a certain level, also creates additional NO and NO2 (i.e., NOx). However, in this regard, it is important to note that, unlike other fuels, the stoichiometry of hydrogen allows for a broad range of excess oxygen, and a correspondingly broad range of detonation temperatures.

This enigma can therefore be resolved by the judicious substitution of only a proportion of hydrogen (relative to the amount of oxygen present at any instant of time) to achieve both lower emissions and improved efficiency and performance, while also limiting the level of oxygen in order to reduce NOx. This can be done by monitoring engine and exhaust conditions with existing engine sensors and applying the information to "trade off" a variable on board source of hydrogen at the cylinder to achieve cleaner, more efficient combustion, with a variable on board source of hydrogen applied in exhaust after treatment systems. This trade-off can be accomplished while also reducing cylinder temperature and oxygen supply by using, for example, exhaust gas recirculation (EGR).

This can be conveniently done because the onboard source of hydrogen fuel can be variably directed to either, or to both, the cylinder and after treatment systems at any particular time, but not all of the time.

With a diesel internal combustion engine, the vehicle can be equipped with a hydrogen injection system capable of injecting varying quantities of hydrogen at a central point downstream of the aftercooler and upstream of the intake valves. As in the gasoline engine, hydrogen is then supplied to one or more gaseous injectors mounted above the intake manifold (not shown). Certain electronic common rail fuel-injection systems lend themselves well to dual-fuel operation with hydrogen, since two distinct diesel injections per compression stroke can be used to limit and contour the pressure created by the rapid combustion of the pre-mixed hydrogen/air charge.

The substitution of hydrogen for diesel fuel provides a more rapid combustion, which results in reduced crank angle durations to combust the fuel. The more rapid rate of combustion generally results in improved fuel efficiency through reduced heat transfer losses, and higher peak pressures. Measurements indicate that the addition of hydrogen reduced the amplitude and frequency of pressure oscillations, which are a measure or indicator of knock and pre-knock conditions. Although one would expect that hydrogen would lead to higher propensity to knock because of the more rapid combustion and associated higher rates of pressure rise and increased pressure oscillations, this is not the case with the proposed hydrogen/air mix and injection strategy.

Hydrogen fuel delivery to the cylinder 17 can also be done using sequential injection. Sequential port injection will provide much better results. While sequential injection is more expensive and requires much more computer processing power it may be economically justifiable on diesel engines that have been built to achieve extraordinary longevity. In this event, a minute hydrogen injection shaft can be strategically bored through the diesel engine head directly into the cylinder 17, to sequentially deliver hydrogen from an injector mounted outside the head on a very small boss. (Normally, fuel injectors require a big boss i.e., more real estate.) This much more expensive retrofit can still be achieved with virtually no invasion of the engine except for the injection shaft and the threaded receptacle for the boss which receives either the injector itself, or the tube from a remotely mounted injector.

Another alternative is to use continuous port injection. This would be comprised of flow tubes drilled into the manifold with single point injection (one injector at the throttle plate).

Figure 6:
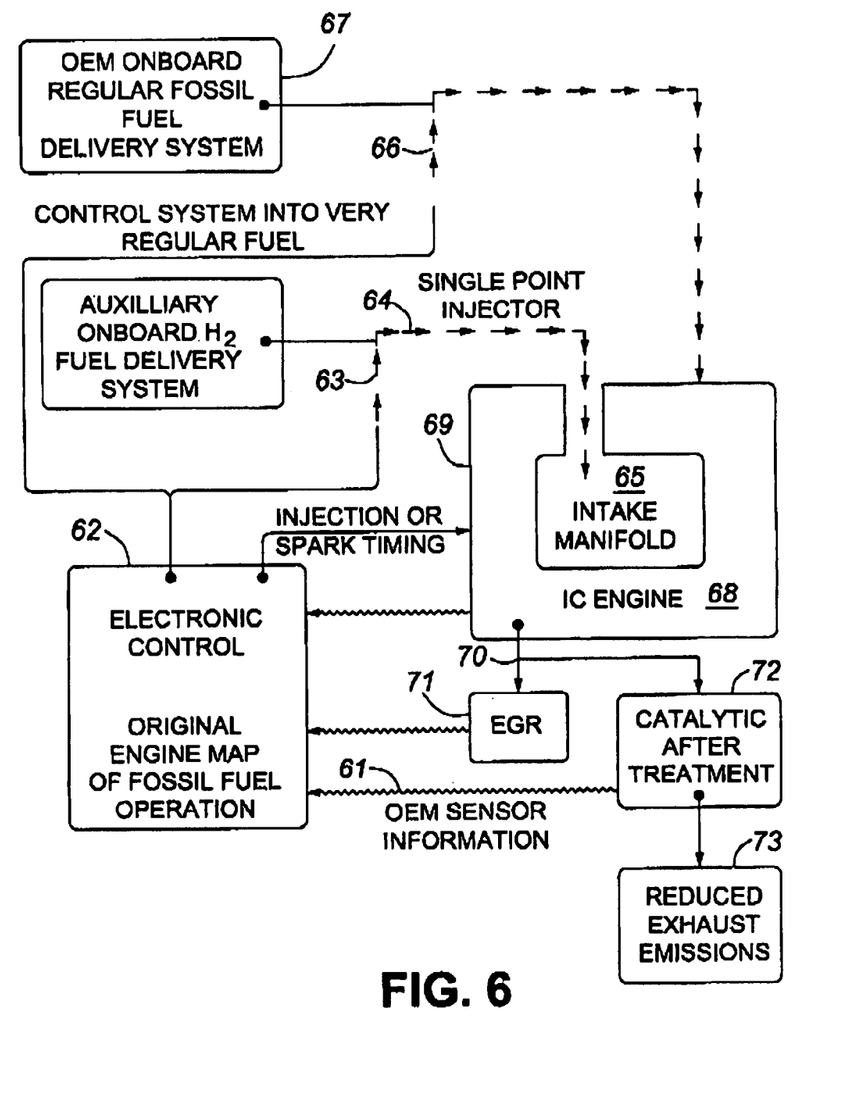
FIG. 6 is a flow diagram of the process used according to the preferred embodiment of the invention.

Referring now to FIG. 6, we have shown a flow diagram illustrating the process for adapting and operating an IC engine with a blend of hydrogen and standard gasoline or diesel fuel.

Using calibration instrumentation and the OEM engine sensors 61 the engine is "mapped" to record fuel volumes vs. engine efficiency across the vehicle's total operating spectrum of load, conditions and performance demands. The resultant engine map is downloaded for reference to become part of the electronic onboard diagnostics 62.

With the engine map for reference and algorithms to duplicate performance, hydrogen fuel 63 is proportionally substituted for the original fossil fuel 67 in certain segments of the engine's operating cycle wherein a proclivity to accept hydrogen reduces emissions without affecting engine performance. Dual fuel delivery 63 and 66, and detonation timing 69 are managed such that engine performance is maintained while emissions are reduced. The total combined energy of hydrogen fuel 63 plus fossil fuel 66 is adjusted to be equal the original reference energy 67 at any instant and condition as recorded by the engine map stored in the onboard diagnostics system 62 (less any energy saved because of improved efficiency resulting from the addition of hydrogen).

Hydrogen fuel 63 is delivered through a single injector 64 into the intake manifold at a single injection point 65 optimized for closest proximity to intake valves in the engine 68. In sequence with hydrogen substitution, engine timing 69 is adjusted to optimize engine performance and emissions reduction 73. Exhaust emissions 70 are monitored and the exhaust gas is directed either to the exhaust gas recirculation system 71 or to the catalytic after treatment 72 to achieve optimal reduction in emissions 73 for the hydrogen fuel substituted.

What is claimed is:

1. A system for controlling an internal combustion engine to use a proportion of hydrogen gas and fossil fuel, comprising:
    a) means for providing a source of hydrogen gas to said engine;
    b) means for delivering hydrogen gas from said source to at least one combustion chamber of said engine; and
    c) means for adjusting operating parameters of the internal combustion engine and controlling an amount and timing of hydrogen delivered to the at least one combustion chamber according to a pre-determined map of engine performance.

2. A system as defined in claim 1, wherein said means for providing a hydrogen source comprises an onboard hydrogen reformer.

3. A system as defined in claim 1, wherein said means for providing a hydrogen source comprises "green" alcohol brought directly into the combustion chamber, wherein the combustion chamber operates as a reformer.

4. A system as defined in claim 1, wherein said means for providing a hydrogen source is comprised of one of a gaseous, cryogenic or anhydride hydrogen on board storage system.

5. A system as defined in claim 1, wherein said means for adjusting said engine operating parameters comprises an engine sensor mapped to monitor fuel volumes and engine efficiency across said engine's operating spectrum and load.

6. A system as defined in claim 5, wherein said means for delivering hydrogen gas is comprised of a hydrogen injector, and wherein the hydrogen injector is controlled to inject hydrogen according to a predetermined hydrogen substitution schedule.

7. A system as defined in claim 6, wherein said injector comprises a continuous port injector.

8. A system as defined in claim 6, wherein said injector comprises a sequential port injector having a hydrogen injection shaft bored through the engine head.

9. A system as defined in claim 6, wherein said hydrogen injector further comprises a fuel injector adapter placed at an intake manifold adjacent a fossil fuel injector to enable delivery of a hydrogen and fossil fuel mixture in close proximity to an engine intake valve.

10. A system as defined in claim 9, wherein said injector is located at a throttle plate.

11. A system as defined in claim 6, wherein said injector comprises a flow tube drilled into an intake manifold.

12. A method of operating an internal combustion engine using a proportion of hydrogen gas and fossil fuel, comprising the steps of:
  a) providing a source of hydrogen gas to said engine;
  b) delivering hydrogen gas from said source to at least one combustion chamber of said engine;
  c) adjusting operating parameters of said engine according to a predetermined map of fuel volumes and engine efficiencies across said engine's operating spectrum; and
  d) controlling said delivery of hydrogen gas according to said predetermined map to provide selective introduction of hydrogen gas throughout the engine's operating cycle.

13. A method as defined in claim 12, wherein hydrogen gas is injected in predetermined quantities and at predetermined time of the engine's operating cycle with fossil fuel near an intake valve, prior to ignition.

14. A method as defined in claim 12, wherein said engine operating parameters are adjusted by:
  a) recording said engine's original equipment manufacturer's (OEM) operating parameters;
  b) mapping said OEM parameters upon introduction of hydrogen in said combustion chamber;
  c) proportionally substituting hydrogen gas for said fossil fuel in certain segments of said engine operating cycle; and
  d) managing detonation timing and delivery of hydrogen gas and fossil fuel to maintain engine performance according to said recorded parameters.

15. A method as defined in claim 14, wherein exhaust emissions are monitored and exhaust gases are re-directed to an exhaust gas recirculator to lower combustion temperature with reduced oxygen and thereby achieve optimal reduction of gas emissions in the engine cylinder.

16. A method as defined in claim 15, wherein said exhaust gas is re-directed to a hydrogen fueled selective catalytic reactor after treatment to achieve optimal reduction of gas emissions.

17. A method as defined in claim 12, wherein said source of hydrogen is provided by on-board reformation of one of ethanol, methanol and natural gas ahead of the engine.

18. A method as defined in claim 12, wherein said source of hydrogen is provided by on-board reformation of one of ethanol, methanol and natural gas directly inside the cylinder.

19. A method as defined in claim 14, wherein mapping of said OEM parameters is achieved by collecting and monitoring combustion pressure and engine cylinder data during hydrogen substitution.

20. A system as defined in claim 6, wherein said hydrogen injector further comprises a fuel injector adapter placed at an intake manifold, said fuel injector adapter having a first injector to supply hydrogen and a second injector to supply fossil fuel.

21. A system as defined in claim 20, wherein said first and second injectors continuously supply hydrogen and fossil fuels to the intake manifold.

22. A system as defined in claim 20, wherein said hydrogen and fossil fuels are variably injected into said intake manifold.

23. A system as defined in claim 20, wherein said injectors operate independently within a common injector body.

24. A system as defined in claim 20, further comprising an Exhaust Gas Recirculating system for recirculating variable amounts of exhaust gases into the intake manifold.

* * * * *